Sheet 1.
(2 Sheets.)

HENRY FAIRBANKS.
Automatic Printing Scale.

No. 107240. Patented Sep 13 1870.

Witnesses.

Inventor.
Henry Fairbanks
by his Attorney

107240

Sheet 2.
(2 Sheets.)

Inventor.
Henry Fairbanks
by his Attorney.
J. D. Stetson

Witnesses.

United States Patent Office.

HENRY FAIRBANKS, OF ST. JOHNSBURY, VERMONT.

Letters Patent No. 107,240, dated September 13, 1870.

IMPROVEMENT IN RECORDING WEIGHING-SCALES.

The Schedule referred to in these Letters Patent and making part of the same.

*To all whom it may concern:*

Be it known that I, HENRY FAIRBANKS, of St. Johnsbury, in the county of Caledonia, in the State of Vermont, have invented certain new and useful Improvements in Scales, or Machines for Ascertaining and Indicating Weights; and I do hereby declare that the following is a full and exact description thereof.

I denominate my improved scale a printing-scale.

Many weighing-machines have been made for insuring absolute or approximate uniformity in the quantities weighed at each operation. Such are very useful in weighing grain and analogous mobile or fluid material, but they are obviously unsuited for weighing irregular quantities of solid material. I have invented a machine which weighs and indicates correctly widely-varying weights, although it is best adapted to weigh masses which are approximately uniform, such as successive wheelbarrow-loads, wagon-loads, or car-loads, of coal, metals, ores, stone, ice, or the like. It requires no inspection or mental operations on the part of the attendant, who may operate successfully after a little practice, even if unable to read, or without light, or under circumstances where the fingers are cold and numb.

All the operations required are effected by turning a light crank alternately in one direction and the other at each weighing operation; and I have provided means for automatically stopping the crank at each end of its motion.

It is not necessary to move the crank to any fixed position at each operation, but it is only moved sufficiently in each case to insure the proper action.

Some or all of the features of my invention may be modified to some degree without impairing the effect of the machine, and various improvements may be made by myself and others at future periods.

I will proceed to describe what I now consider the best means of carrying out my invention. I will afterward designate the several points which I claim as new.

The accompanying drawing forms a part of this specification.

Figure 1 is a front view.
Figure 2 is a plan view.
Figure 3 is a cross-section through the beam, the screw which transmits motion to the poise, and the guide-rod. It also represents the poise, and what I term the poise-mover.

The additional figures are on a larger scale. They both represent, as do also the preceding figures, the condition which obtains after what I term the preparatory motion, and before what I term the weighing motion is completed.

Figure 1:
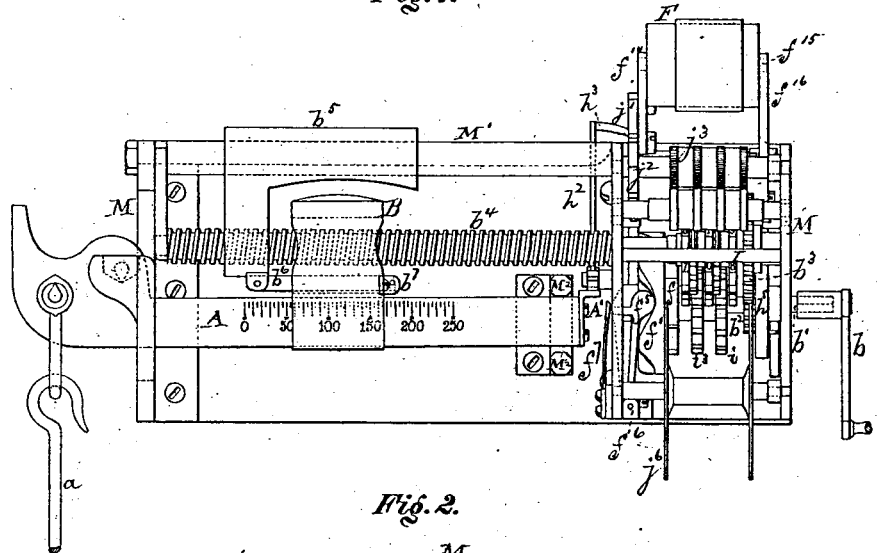
Figure 2:
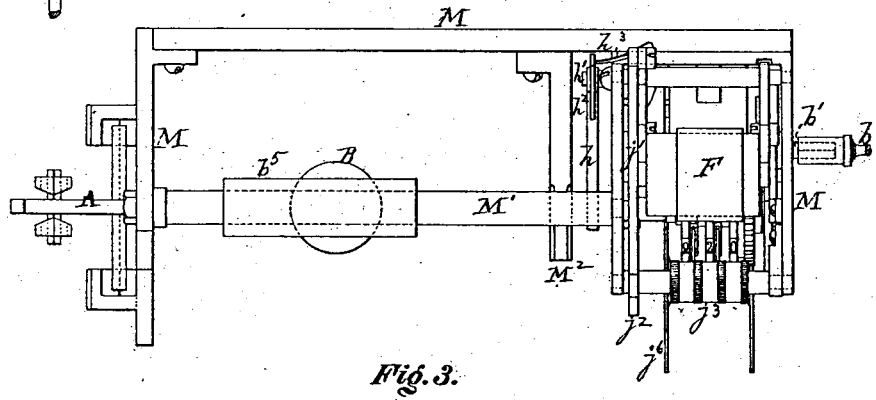
Figure 3:
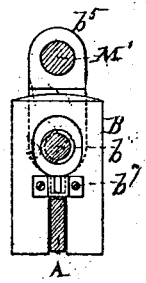
Figure 4:
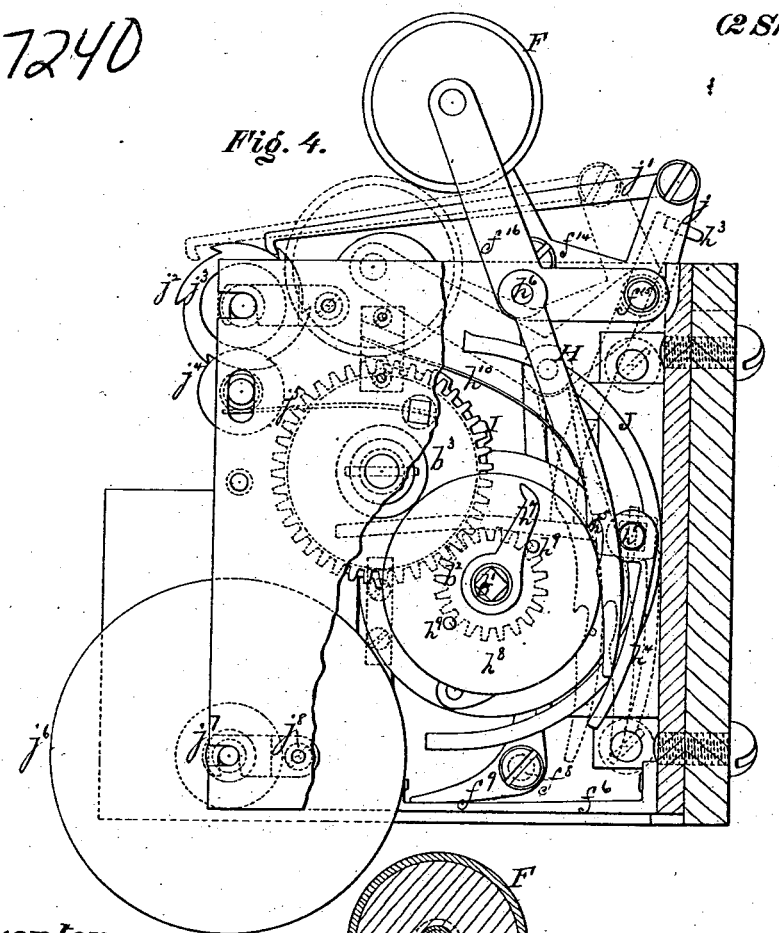
Figure 4 is an end elevation, with a part of the end plate removed or broken away, to show the mechanism.
Figure 5:
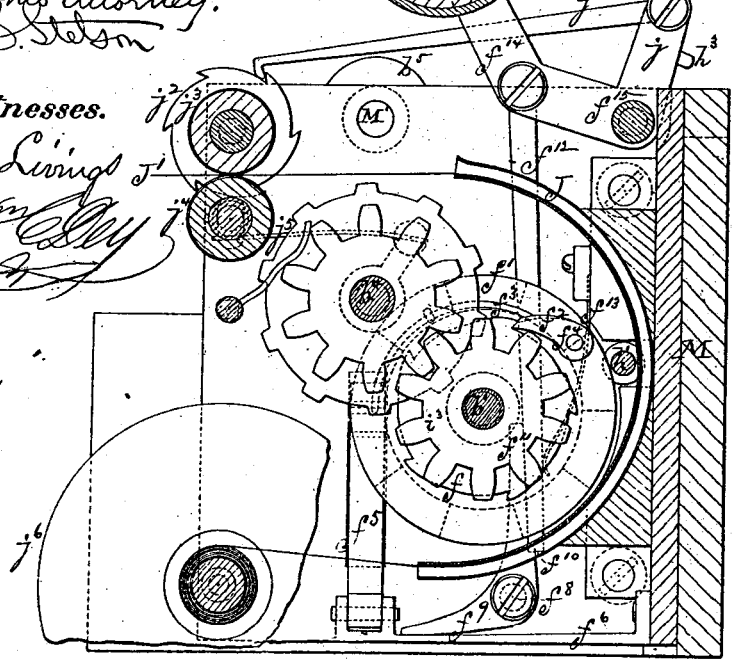
Figure 5 is a cross-section in a plane near the center of the operating mechanism.

The position of the parts, when the printing or embossing is being effected, is indicated in light dotted lines in fig. 4.

The drawing represents the novel parts, with so much of the ordinary parts as is necessary to show their relation thereto.

Similar letters of reference indicate like parts in all the figures.

My scale may be a platform or other ordinary scale. Its beam is indicated by A.

The platform, with its supporting means, (not represented,) may be of any ordinary or suitable construction.

The beam is, by preference, perfectly smooth on the upper edge, and the graduating may be done on the plane face at the side.

The knife-edges may be of any ordinary construction giving sufficient delicacy with strength and durability.

The rod by which the mass to be weighed transmits the whole, or a certain proportion of its weight, to the scale-beam A, is indicated by $a$.

B is a sliding poise. It is adapted to fit and slide easily on the scale-beam A.

A screw, $b^4$, is mounted in suitable bearings in the fixed frame-work of the machine, or the parts attached thereto.

I will indicate the entire fixed frame-work, when necessary, by the letters M M$^1$, &c.

There is a smooth rod, M$^1$, which forms a part of the fixed frame-work, and stands exactly parallel to the axis of the screw $b^4$, and serves as a guide-rod to the poise-mover $b^5$, which is adapted to slide on the rod M$^1$, and is threaded to match the screw $b^4$, and to be moved endwise thereby as the screw is rotated in one direction or the other.

A light connecting-bar, $b^6$, extends from the lower extremity of the poise-mover $b^5$, and, extending loosely through a larger hole in the poise B, is delicately hinged to the poise at the point $b^7$.

This mode of connecting allows the light rod $b^6$ to maintain a position exactly horizontal when the beam A, and, consequently, the poise B, are elevated, which is the position it maintains until the weighing point is determined.

The extending of the bar $b^6$ so as to connect to the poise at the opposite side gives a very considerable length to the bar, and, consequently, reduces the angle of its inclination, as the beam A rises and sinks, without extending the mechanism horizontally much beyond the bare diameter of the poise.

I turn the screw $b^4$ by means of a hand-crank, $b$, which turns a shaft, $b^1$, and the attached gear-wheel, $b^2$.

This gear-wheel $b^2$ gears into a larger gear-wheel, $b^3$, on an extension of the shaft of the screw $b^4$.

It will now be seen that, by turning the hand-crank $b$ in one direction or the other, it communicates motion from the shaft $b^1$ and small gear-wheel $b^2$ to the larger gear-wheel $b^3$, which, being fixed on the shaft or extended axis of the screw $b^4$, causes this screw to rotate in one direction or the other; and it will also be clearly understood that such revolving of the screw $b^4$ moves the poise-slider $b^5$, and that this, by the light horizontal connecting-bar $b^6$, acts at the point $b^7$ to gently slide the poise B outward or inward on the beam A.

The entire train of mechanism by which the poise B is moved out and in by the attendant is indicated by the several letters $b$ $b^1$ to $b^7$.

I provide stops, $M^2$ $M^3$, forming a part of the rigid frame-work of the machine, which limit the motion of the beam A; but it is important that such motion be enough to allow an efficient action of the delicate mechanism now to be described, and which delicate mechanism performs the plural functions of arresting the motion of the entire train of mechanism just described when the poise has been moved backward so as to stand momentarily a little within the weight of the load; also, to arrest the motion of the same train of mechanism when, by the reverse motion of the hand of the attendant, it has been operated in the reverse direction sufficiently to move the poise outward (or toward the right) until the exact weight is reached; and also to elevate the printing-hammer, move along a strip of paper, adjust a train of type-wheels carrying the ordinary numerals in strong raised types, and, when the weight is exactly indicated, strike a blow thereon by the printing-hammer, which is faced with rubber, so as to cause the impression of the proper figures to be indented in the paper.

The attendant requires simply to be instructed to turn the crank in one direction: that which moves the poise inward (or to the left) until the crank is stopped, and then to turn it moderately in the other direction; that which moves the poise outward (or to the right) until the hand is again stopped.

The automatic stopping mechanism must be made sufficiently strong to withstand the gentle force of the hand of a properly-instructed attendant, or to arrest the motion of the crank $b$ with sufficient force to convey the intimation distinctly to his mind that the proper limit of the motion has been reached.

The shaft $b^1$, operated, as before described, directly by the crank $b$, carries many parts additional to the gear-wheel $b^2$, before described. One of these parts is a ratchet-wheel, $f$, which is keyed or otherwise firmly fixed. By its side, on the left, is a crown cam-wheel $f^1$, having five equal rounded projections on the left face.

A pawl, $f^2$, pressed home by a spring, $f^3$, is mounted on a pivot, $f^4$, in the crown cam-wheel, $f^1$, and takes in the teeth of the ratchet-wheel $f$, so that, when the hand-crank $b$ is turned in the direction to move the poise outward, (or to the right,) the wheel $f^1$ is compelled to turn with it.

There is an upright piece, $f^5$, hinged at the bottom to a stout spring, $f^6$, which is fixed at its rear end to the frame-work M. This piece $f^5$ is vibrated by the crown-cam $f^1$, as will be obvious.

There is an upright spring, $f^7$, adapted to serve also as a dog. It presses the intermediate piece $f^5$ constantly to the right, so as to maintain its bearing against the crown-cam $f^1$. This spring-dog $f^7$ is, consequently, compelled to vibrate with the motion of the intermediate piece $f^5$.

On the outer or right-hand end of the main beam A is bolted a hardened steel piece, A', having the form represented, and the several parts are so adjusted, relatively to each other, that, when the beam A is up, the spring-dog $f^7$ passes, at each vibration, under this extension of the main beam A.

Now, the poise B having been sufficiently moved to the left, by the means before described, to stand within the weight of the load, the beam A is in its highest position, and, as the hand-crank $b$ is turned, moving the poise outward, or to the right, the action of the crown-cam $f^1$, and the consequent vibration of the pieces $f^5$ and $f^7$, proceeds freely so long as the beam A remains elevated. This action continues, with the poise gradually moving outward, (to the right,) until the point is reached where the weight of the mass to be weighed is insufficient to sustain the beam A in its elevated position; in other words, the poise B has been moved until it has attained the position which corresponds to the exact weight of the load. At this juncture, the beam A gently descends. When it has descended a little, the steel extension piece just described is struck by the vibrating spring-dog $f^7$. This arrests the vibration of the parts $f^7$ and $f^5$, and, therefore, necessarily arrests the motion of the crown cam-wheel $f^1$, and of the hand-crank $b$ and its connected mechanism.

At this stage the weighing of the load has been effected. The next operation, the printing of the amount of the weight, follows instantly, and before the action of the hand upon the crank $b$ has stopped.

The tendency of the hand of the attendant to continue the motion thus suddenly arrested, acts with sufficient force on the crown-cam $f^1$ to lift on the smoothly-rounded surface of the intermediate piece $f^5$, and cause a slight upward motion of the stout spring $f^6$, to which it is pivoted below. The motion thus communicated results in liberating the previously elevated printing-hammer F. All the several elements in the train of mechanism producing this effect are lettered $f$ $f^1$ to $f^{16}$.

There is a bent or bell-crank lever pivoted to the fixed frame-work by the pivot $f^8$. This lever performs important functions, and I will designate its parts separately. Its lower arm, $f^9$, rests upon the stout spring $f^6$. The upper arm, $f^{10}$, has a shoulder, $f^{10}$. When the piece $f^5$ is vibrating in its ordinary position, the spring $f^6$ stands in the position represented, and the shoulder $f^{10}$ receives and sustains the lower end of a supporting bar, $f^{12}$, which is pressed thereupon by the spring $f^{13}$; but the moment the poise has reached the point where it balances the weight of the load and arrests the vibrations, and the part $f^5$ and its connections are drawn upward by the action of the crown-cam, as above described, the elevation of the spring $f^6$ slightly tilts the lever $f^8$, and its upper arm $f^{10}$ pushes the rod $f^{12}$ off the shoulder $f^{10}$ and allows it to fall.

The supporting bar $f^{12}$ is connected at its upper end to a lever, $f^{14}$, which is fast upon a shaft, $f^{15}$, and which carries, by means of the lever or arm $f^{14}$ and of a corresponding arm, $f^{16}$, the printing-hammer F, coated with a thick rubber blanket.

The slipping of the rod $f^{12}$ off the notch $f^{10}$ causes the hammer F to fall and produce the impression by striking the paper upon the type-wheels.

The construction and operation of the type-wheels, and also of the rolls which give motion to the strip of paper, the reel which carries the paper, and a sort of tube or inclosing-case which guides the paper from the reel to the point where it is printed, will be briefly described further on. I will now proceed to describe the action of the mechanism which restores the hammer to its elevated position.

In a moment after the vibrating action of the parts $f^5$ and $f^7$ is arrested, and the hand-crank $b$ is stopped, the printing of the weight is completed, and the wagon or other load having been removed from the platform, and another substituted, the attendant commences to turn the crank in the opposite direction, so as to move the poise again to the left. The pawl $f^2$ yields and allows this motion to go on without turning the cam-wheel.

If the weight of the next load is greater than that of the one last weighed, the raising of the printing-hammer will be effected immediately. But suppose the weight is considerably less than that last weighed, the crank $b$ must, in such case, be turned continuously for a considerable period, so as to slide the poise B to the left until a point a little within the weight of the load is reached. Now, whenever the poise stands within the weight of the load, (by which I mean in the position to indicate upon the graduations on the beam A, if there are any such graduations, a weight a little less than the true weight of the load,) the beam A commences to rise. It rises until it strikes a delicate horizontal lever, $h$, which, by means of connections marked successively $h^1$ up to $h^{10}$, causes the further motion of the hand-crank in this direction to elevate the printing-hammer, move the paper a little, and then, after restoring all the parts to the condition ready to weigh the load, causes the further motion of the hand-crank $b$, in this direction, to be positively arrested.

I will describe these operations in detail.

The lever $h$ is fixed upon a shaft, $h^1$, which is mounted in bearings in the frame-work M, in the position represented, and is free to turn to a limited extent, with a very slight force, while there is an arm, $h^2$, extending upward, as represented, and provided with a delicate spring, $h^3$, the function of which will presently appear.

There is also an arm, $h^4$, extending downward in the position represented.

The arm $f^{16}$ of the printing-hammer, before described, carries a pendent rod, H, connected thereto by the pivot $h^6$, and which, when the printing-hammer is down, is in the position to be acted upon by the arm $h^4$, just described.

There is an arm, $h^7$, fitted loosely on the shaft $b^1$, which is adapted to catch in a notch, $h^5$, in the rod H, and to lift the rod H and arm $f^{16}$, and, consequently, the printing-hammer F and its connections, whenever the said pendent rod H is pressed toward it to a sufficient extent.

There is a wheel, $h^8$, fixed firmly on the shaft $b^1$, and provided with two pins, $h^9 h^9$, either of which is capable of acting against the arm $h^7$ and compelling it to revolve with it. But, during all the early part of the motion of the shaft $b^1$ in running the poise B inward, (or to the left,) these parts are of no effect, because the pendent rod H is held out of the range of the arm $h^7$ by means of a delicate spring, $h^{10}$.

But when the poise B has been moved inwardly (or to the left) to the proper extent to get within the weight of the load, and the beam A commences to rise, the beam, in rising, strikes and lifts slightly the delicate lever $h$, above described; the elevation of $h$ moves the arm $h^4$, and thus presses the pendent and notched arm H $h^5$ a little forward toward the shaft $b^1$. This movement presents the notch $h^5$ in the position to catch and be acted upon by the arm $h^7$, before described, which being, revolved strongly by the direct action of the hand-crank $b$, lifts forcibly on the lever or arm $f^{16}$ and its connections, and raises it and the connected printing-hammer F. The hammer thus lifted remains supported by the foot of the bar $f^{12}$, resting on the shoulder $f^{10}$, as before described.

The elevation of the hammer and its connections also moves backward an arm, $j$, not previously described, which extends upward from the shaft $f^{15}$, and this movement, by means of the pawl $j^1$, acts upon a ratchet-wheel, $j^2$, and turns it, and consequently the connected roller $j^3$, to a sufficient extent to move the paper J' ready for the next operation.

The paper, it will be understood, is held by this roller $j^3$ and another roller, $j^4$, below, the two rollers being pressed together with sufficient firmness by means of the two springs, $j^5 j^5$, fixed on the frame-work in the positions shown.

The backward motion of the arm $h^2$ also presses backward on the delicate spring $h^3$, before described, and this, by pressing gently backward the arm $h^2$, before described, elevates the light arm $h$ and keeps it out of contact with the beam A, until the weighing of the load has been effected.

The operation of weighing, by turning the crank $b$ in the proper direction and moving the piece B to the right, proceeds as before described, and the tumbling of the printing-hammer F, to record the weight, again allows the delicate lever $h$ and its connections to resume the proper position for again arresting the motion and preparing for the succeeding operation.

Now, the type-wheels are constructed and arranged with special reference to the other mechanism to perform their proper functions in this machine, but their connection with each other, so that the type-wheel for units operates the type-wheel for tens to the extent of one-tenth for each complete revolution of the units wheel, and the wheel for tens operates similarly upon the next, is very like that long known in steam-engine registers and the like.

The unit-wheel I is fixed firmly on the gear-wheel $b^2$, before described, and has a single tooth, which operates at each revolution to give a slight motion to the wheel $i$, which is fitted loosely on the shaft $b^1$.

This wheel $i$ is geared to a gear-wheel on the next printing wheel, the wheel which prints the figures indicating the tens, and which I have denoted $i^2$, and so on to any extent desired.

I can carry the figures to tens of thousands, or higher, by simply prolonging the train of wheels $i i^1 i^2$, &c.

As the hand-crank $b$ and its connections are turned in one direction or the other, the unit-wheel I and its associated printing-wheels are correspondingly turned in one direction or the other to correspondingly change the figures which are presented to the blow of the hammer F, and impress their figures plainly upon the paper.

I have, as before stated, indicated the paper by the letter J'. It is inclosed in a curved tube of an oblong or flattened cross-section, which, being fixed, might be described as forming a part of the frame-work M, but which I have designated by the separate letter J.

The paper is wound upon a reel, $j^5$, which is mounted temporarily in bearings in the frame-work, as represented, and may be removed to be refilled or to have another substituted in its place, after lifting the locking-hook $j^7$, which turns upon the pivot $j^8$. It will be understood that, when a new roll of paper, J', is introduced into the bearings, and the locking hook $j^7$ is pressed down to confine it, and the end of the roll of paper is passed up through the flattened curved tube J and introduced so as to be seized by the rollers $j^3 j^4$, the machine may be operated for a long time, and the amount of the weight properly registered without any further attention than above described.

I can employ an impression-ribbon to blacken the impressions, if desired, but I have not found it necessary in my experiments.

It may be convenient to group the printed records of successive loads, six or more together, for convenience of adding, and this may be done by making one division of the ratchet $j^2$ longer than the others.

I provide a hook connection between the end of the light horizontal rod $b^6$, and the pin or hinge $b^7$ to allow the rod $b^6$ to be readily connected and disconnected from the poise.

When, for any reason, it is desired to disconnect it and put it out of use, it is necessary simply to unhook the rod from the hinge $b^7$, and the poise may then be moved by hand in the ordinary manner, and the weight ascertained by inspection of the beam, as usual.

I provide a small weight, just sufficient to compensate for the removal of its proportion of the weight of this bar, and to use such small weight, not represented, by attaching it to the poise whenever the machine is to be thus used as an ordinary scale; or I can, if desired, balance the light bar $b^6$, by forming it with a heavy end, extending beyond the pivot on which it is permanently hinged.

When the type-wheels are not blackened, and the figures are denoted simply by the impression of the type into the paper, I esteem it important not to press on the figures by the rollers $j^3 j^4$.

It will be observed that the surface of the upper roller is depressed along where the lines of figures pass; in other words, the rollers only bite the paper between the figures.

It is well to have one or both of the rollers $j^3 j^4$ milled, to insure a good hold on the paper J'.

It will be understood that my improved scale allows the addition of separate additional poises to a suitable link or rod, hanging from knife-edges near the outer or right-hand end of the beam A. No such provision is represented, but it is only necessary to provide the ordinary means for effecting this end, in order to allow the quantities which the machine is capable of weighing to be very greatly increased or diminished, without interfering with the delicacy of its indications; in other words, I can add a poise at the end of the beam, which shall constitute a permanent addition of one hundred pounds, one ton, or any other desired amount, to the quantities indicated by the printing-machine. In such cases, it is necessary simply to allow therefor by adding a corresponding amount to each quantity indicated or printed. The addition may be made mentally or by figures.

Ordinarily, the works of the machine will not be made accessible to the attendant or the workman who turns the crank.

The proprietor or superintendent adjusts the scale, putting on such poises at the end as the previously known approximate weights of his loads will require, locks up the casing of the machine, and, at the end of the day's work, or at any other period, he opens the casing and removes the printed portion of the paper. The number of impressions thereon will inform him of the number of loads weighed; and, in adding the amounts he will take care to add also the proper amount for the fixed weights previously applied.

My invention allows that the risk of mistake involved in this operation may be avoided by simply setting the printing-wheels forward to the amount required to compensate for the permanent weight added.

To effect this, it is necessary simply to set the printing-wheels I $i^3 i^4$, &c., sufficiently forward at the commencement, and the machine will then run forward and back from that advanced number, instead of running forward from zero.

The same method may also be adopted for allowing tare. Thus, if the weight of the single wheelbarrow with which a cargo is moved is fifty-four pounds, the printing-wheels may be set back that amount at the commencement, and the operation will then be performed as before, and the true weights of the loads, exclusive of the barrow, will be printed on the paper.

The motion of the poise in one direction I term the weighing motion. In this, which in this construction described is the outward motion, it is important that the communication of force shall be in a plane passing through the axis of motion of the beam.

There is another motion of the poise in the opposite direction, which I term the preparatory motion. In this motion the direction of the moving force is not so important.

It will be obvious that my invention may be reversed, so that the poise, being previously too far out on the beam, the weighing will be determined by a delicate rising of the beam as the poise is moved slowly inward at each operation. In such case I should term the inward movement of the poise the weighing motion of the poise, and the outward motion the preparatory.

I should, in such case, also term the rising of the beam the weighing motion of the beam, and the previous sinking thereof the preparatory motion thereof, all these relations being the exact reverse of that shown. In such case I adjust the beam so that it would be level, and would be acted on horizontally by the bar $b^6$, or equivalent, when in its depressed, instead of in its elevated position.

I propose to employ anti-friction wheels to support the poise B on the beam A, when desired; but my provisions for transmitting the operating force to the screw $b^4$, and again from the poise-slider $b^5$, carried thereby to the poise B, are so perfect that I do not esteem the reduction of such resistance to be important.

I am aware that many devices have been before proposed for variously impressing on paper, marks indicating the amount of the weight.

I have invented details which I esteem of much importance in themselves, but I do not limit my entire invention to the exact form and arrangement of each member of the mechanism; nor do I limit my entire invention to the combination of all the features of my entire machine; but

I claim—

1. A weighing-machine, provided with the index-wheels I, having figures so formed thereon that their shape may be impressed on a strip of paper, in combination with an elastic coated hammer F, or its equivalent, for recording the weighings, substantially as herein set forth.

2. The light lever $h$, arm $h^4$, the shoulder $h^3$, on the hooked rod H, spring $h^{10}$, and actuating-wheel $h^6$, or their several equivalents, arranged in connection with the other mechanism, to induce the variable preparatory movement of the printing-hammer F, or its equivalent, and to, at the same time, effect the preparatory stop of the poise-moving means, and of the entire mechanism, as herein specified.

3. The means herein described for automatically moving a readily detachable strip of paper, J', at each operation of the weighing and automatic printing mechanism, the action being controlled by the movements of the beam, as specified.

4. The grooved feed-rollers, in combination with the registering and automatic printing mechanism, and with the strip of paper J', or its equivalent, and with the beam and poise moved thereon, as specified.

5. The spring $h^9$, for supporting the lever $h$, or its equivalent, when out of use, in combination with the beam A and printing mechanism, as specified.

6. The arrangement of the vibrating feeler $f^7$, relatively to the beam and to the operating mechanism, as described, so that it is restrained after the weighing movement of the beam, substantially as and for the purpose herein set forth.

7. The primary vibrating part $f^5$, arranged to serve as a pusher to the feeler $f^7$, but free to move in another direction, as and for the purposes specified.

8. The feeler $f^7$, the vibrating pusher $f^5$, and connected piece $f^6$, arranged as represented relatively to each other and the operating mechanism, so that the piece $f^6$ is moved only when the vibrating motion of its associate $f^3$ is restrained, and thereby initiates the action of the other mechanism, substantially in the manner herein set forth.

9. The poise-moving mechanism, in combination with the mechanism for automatically printing the weight, as specified.

10. The preparatory stop mechanism, when controlled as specified by the preparatory motion of the beam, as and for the purposes herein set forth.

11. The weighing-stop mechanism, in combination with means for automatically printing the weight, as specified.

12. The combination of automatic printing mechanism with automatic weighing mechanism, substantially as herein specified.

In testimony whereof I have hereunto set my name in presence of two subscribing witnesses.

HENRY FAIRBANKS.

Witnesses:
THADDEUS FAIRBANKS,
ANNIE N. FAIRBANKS.